United States Patent
Spaulding et al.

(10) Patent No.: US 6,822,760 B1
(45) Date of Patent: Nov. 23, 2004

(54) METHOD OF PROCESSING AND PAYING FOR AN EXTENDED COLOR GAMUT DIGITAL IMAGE

(75) Inventors: Kevin E. Spaulding, Spencerport, NY (US); Edward J. Giorgianni, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/543,652

(22) Filed: Apr. 5, 2000

(51) Int. Cl.$^7$ .............................. B41B 1/00; G06K 9/36
(52) U.S. Cl. ........................................ 358/1.9; 382/167
(58) Field of Search ........................ 358/1.9, 518, 520, 358/523, 537, 539, 115, 442, 444; 382/162, 167; 702/174, 182, 198; 705/62, 402, 408, 415

(56) References Cited

U.S. PATENT DOCUMENTS

| | | | |
|---|---|---|---|
| 4,417,270 A | | 11/1983 | Nagao et al. |
| 4,903,317 A | | 2/1990 | Nishihara et al. |
| 5,122,873 A | | 6/1992 | Golin |
| 5,268,754 A | | 12/1993 | VanDeCapelle et al. |
| 5,297,219 A | * | 3/1994 | Weldy ........................ 382/299 |
| 5,317,425 A | | 5/1994 | Spence et al. |
| 5,333,069 A | | 7/1994 | Spence |
| 5,510,910 A | | 4/1996 | Bockman et al. |
| 5,528,377 A | * | 6/1996 | Hutcheson .................. 358/298 |
| 5,537,228 A | * | 7/1996 | Dillinger ..................... 358/502 |
| 5,583,665 A | * | 12/1996 | Gregory et al. ............. 358/504 |
| 5,583,666 A | * | 12/1996 | Ellson et al. ................ 358/518 |
| 5,666,215 A | | 9/1997 | Fredlund et al. |
| 5,713,062 A | | 1/1998 | Goodman et al. |
| 5,760,386 A | | 6/1998 | Ward |
| 5,892,891 A | * | 4/1999 | Dalal et al. ................. 358/1.9 |
| 5,949,967 A | | 9/1999 | Spaulding et al. |
| 5,982,924 A | * | 11/1999 | Power et al. ................ 382/162 |
| 5,986,771 A | * | 11/1999 | Henderson et al. ......... 358/448 |
| 5,990,931 A | | 11/1999 | Nimri et al. |
| 6,075,888 A | * | 6/2000 | Schwartz .................... 382/167 |
| 6,157,436 A | * | 12/2000 | Cok ............................ 355/40 |
| 6,229,629 B1 | * | 5/2001 | Tsai ............................ 358/486 |
| 6,282,311 B1 | * | 8/2001 | McCarthy et al. .......... 382/162 |
| 6,282,312 B1 | * | 8/2001 | McCarthy et al. .......... 382/162 |
| 6,335,983 B1 | * | 1/2002 | McCarthy et al. .......... 382/162 |
| 6,421,142 B1 | * | 7/2002 | Lin et al. .................... 358/1.9 |
| 6,516,089 B1 | * | 2/2003 | McCann et al. ............ 382/166 |

* cited by examiner

Primary Examiner—Madeleine Nguyen
(74) Attorney, Agent, or Firm—Raymond L. Owens

(57) ABSTRACT

A method for processing an extended color gamut digital image so as to represent the extended color gamut digital image in a storage color space having a limited color gamut digital image and for paying for such processed digital image including a user sending or authorizing the sending of an extended color gamut digital image to a processing site where the extended color gamut digital image is to be processed. Processing such extended color gamut digital image at the processing site can be accomplished by adjusting the color values of the extended color gamut digital image to fit within the limited color gamut to form a limited color gamut digital image, and representing the limited color gamut digital image in the storage color space. Further, by determining one of more residual images representing differences between the extended color gamut digital image and the limited color gamut digital image, and associating the one of or more residual image(s) with the limited color gamut digital image in the storage color space such that the associated residual image(s) and the limited color gamut digital image are adapted to be used to form a reconstructed extended color gamut digital image. The method also includes the user making payment, and making the processed extended color gamut digital image available to the user via a communications network.

21 Claims, 9 Drawing Sheets

METHOD OF PROCESSING AND PAYING FOR AN EXTENDED COLOR GAMUT DIGITAL IMAGE

CROSS REFERENCE TO RELATED APPLICATIONS

Reference is made to commonly assigned U.S. patent application Ser. No. 09/162,205 filed Sep. 28, 1998; Ser. No. 09/162,026 filed Sep. 28, 1998; Ser. No. 09/489,367 filed Jan. 21, 2000; Ser. No. 09/162,201 filed Sep. 16, 1998; Ser. No. 09/354,808 filed Jul. 16, 1999; and Ser. No. 09/543,038 filed Apr. 5, 2000 entitled "Method for Providing Access to an Extended Color Gamut Digital Image and Providing Payment Therefor" by Kevin E. Spaulding et al., the disclosures of which are incorporated herein by reference.

FIELD OF THE INVENTION

The present invention relates to the field of digital imaging, and more particularly to processing an extended color gamut digital image and making payment therefor.

BACKGROUND OF THE INVENTION

In digital imaging systems, there are many ways to represent images in digital form. Not only are there many different formats of digital files, but there are also a large variety of different color spaces and color encodings that can be used to specify the color of digital images.

In some cases, the color encoding can be in terms of a so-called device independent color space, such as the well-known CIELAB color space. In recent years this color space has been used extensively to specify the color of digital images in color-managed digital imaging systems. In some cases, the image can actually be stored in the CIELAB color space. More commonly, the color space can be used to connect device profiles, which can be used to describe the color characteristics of various color imaging devices such as scanners, printers, and CRT video displays. The KODAK PhotoYCC Color Interchange Space is another example of a device independent color space that can be used to encode digital images.

In other cases, the color-encoding can be in terms of a device dependent color space. Video RGB color spaces and CMYK color spaces are examples of this type. When a color image is encoded in a device dependent color space, it will have the desired color appearance when it is displayed on the particular output device associated with that color space. The advantage of a device dependent color space is that the image is ready to be displayed or printed on the target device. However, the disadvantage is that the image will necessarily be limited to the color gamut of the target device. The color gamut of an imaging device refers to the range of colors and luminance values that can be produced by the device. Therefore, if the target device has a limited dynamic range, or is incapable of reproducing certain saturated colors, then it is not possible to encode color values outside of the range of colors that can be produced on the device.

One type of device dependent color space that has become quite widespread for use as a storage and manipulation color space for digital images is the video RGB color space. In reality, there are many different video RGB color spaces due to the fact that there are many different types of video RGB displays. As a result, a particular set of video RGB color values will correspond to one color on one video display and to another color on another video display. Therefore, video RGB has historically been a somewhat ambiguous color representation due to the fact that the color values can not be properly interpreted unless the characteristics of the target video display were known. Nonetheless, video RGB color spaces have become the defacto standard in many applications because the creation, display and editing of images on video displays are central steps in many digital imaging systems.

Recently, there have been efforts to standardize a particular video RGB color space in order to remove the ambiguity in the interpretation of the color values. (See the proposed IEC TC100 sRGB Draft Standard). One such proposed standard color space is known as "sRGB." This color space specifies a particular set of red, green, and blue primaries, a particular whitepoint, and a particular non-linear code value to light intensity relationship. Together, these tightly define the overall relationship between the digital code values and the corresponding device independent color values.

Although the use of a standard video RGB color space eliminates much of the ambiguity usually associated with video RGB color spaces, it does nothing to address the fact that this color space has a limited color gamut relative to other output devices. Additionally, any output device will have a limited color gamut relative to that of an original scene. For example, a scene can have a luminance dynamic range of 1000:1 or more, whereas a typical video display or reflection print will have a dynamic range on the order of 100:1. Certain image capture devices, such as photographic negative film, can actually record dynamic ranges as large as 8000:1. Even though this is larger than the luminance dynamic range associated with most scenes, the extra dynamic range is often useful to provide allowance for exposure errors, light source variations, etc.

In order to encode images from various sources in a video RGB representation, it is necessary to discard information that is outside the color gamut of the video RGB color space. In some cases, such as when it is desired to encode the appearance of colors in an original scene or the colors captured by a photographic negative, a great deal of information will typically need to be discarded due to the large disparity in the dynamic ranges. For the case where it is desired to scan a reflection print and store it in a video RGB color space, it is still necessary to discard a substantial amount of information due to the mismatch in the color gamuts, even though the luminance dynamic ranges can be quite similar.

For example, FIG. 1 shows a comparison of a typical Video RGB Color Gamut 10 and a typical Reflection Print Color Gamut 12. In this case, a*-b* cross-sections of the color gamuts are shown in the CIELAB space at an L* of 65. The colors that are inside the boundary are within the gamuts of the respective devices, while those that are outside the boundary cannot be reproduced, and are therefore referred to as "out-of-gamut" colors. It can be seen that there is a large set of color values with a b* value larger than 60 that can be produced on the printer, but are outside the color gamut of the video display. As a result, if the reflection print were scanned and stored in a video RGB color space, it would not be possible to encode this color information.

The mismatch between the video RGB color gamut and the color gamuts of other output devices and image sources represents a serious limitation on the usefulness of the video RGB color space. However, in many cases, the convenience of storing the image in a color space that is ready for direct display on a computer video CRT has been the over-riding factor in the determination of the preferred color space. This has come at the expense of applications that can utilize the extended color gamut information that can have existed in an input image. One of the most serious limitations of this approach involves cases where it is desired to modify the digital image. In this case, it is frequently beneficial to use the information that must be clipped off when representing the image in a video RGB color gamut to provide a better quality modified image. For example, if an image needs to be darkened due to the fact that the original image was over-exposed, the video RGB image will generally not retain the highlight detail information that could be used to darken the image.

SUMMARY OF THE INVENTION

It is an object of the present invention to overcome the limitations of the prior art by processing a digital image with an extended color gamut digital image and by making payment for such processed image.

This object is achieved by a method for processing an extended color gamut digital image so as to represent the extended color gamut digital image in a storage color space having a limited color gamut digital image and for paying for such processed digital image, comprising the steps of:

a) a user sending or authorizing the sending of an extended color gamut digital image to a processing site where the extended color gamut digital image is to be processed;

b) processing such extended color gamut digital image at the processing site by:
   i) adjusting the color values of the extended color gamut digital image to fit within the limited color gamut to form a limited color gamut digital image;
   ii) representing the limited color gamut digital image in the storage color space;
   iii) determining one of more residual images representing differences between the extended color gamut digital image and the limited color gamut digital image; and
   iv) associating the one of or more residual image(s) with the limited color gamut digital image in the storage color space such that the associated residual image(s) and the limited color gamut digital image are adapted to be used to form a reconstructed extended color gamut digital image;

c) the user making payment; and d) making the processed extended color gamut digital image available to the user via a communications network.

ADVANTAGES

The present invention also has the advantage that either the limited color gamut digital image or the extended color gamut digital image can be made available via a communications network.

The present invention has the advantage that a digital image can be stored in a color space convenient for a particular application while overcoming the color gamut limitation associated with that color space and that a user can conveniently make payment for processing such digital image.

The present invention has the additional advantage that the use of the extended color gamut information is optional. As a result, the benefits of the extended color gamut information can be gained by applications that are able to make use of it, without introducing an image quality or computation penalty for applications that do not require the optional information or that are not able to make use of it.

The present invention has the additional advantage that the extended color gamut information can be used to modify the image so as to provide a larger amount of adjustability in the image modification process.

The image can be stored, for example, in a video RGB color space that is well-adapted for fast and convenient display on a computer system without compromising the potential quality of the image. This provides a user with the advantage that the user can process such image and conveniently make payment over a network such as the Internet for such processed image.

DETAILED DESCRIPTION OF THE INVENTION

Figure 2:
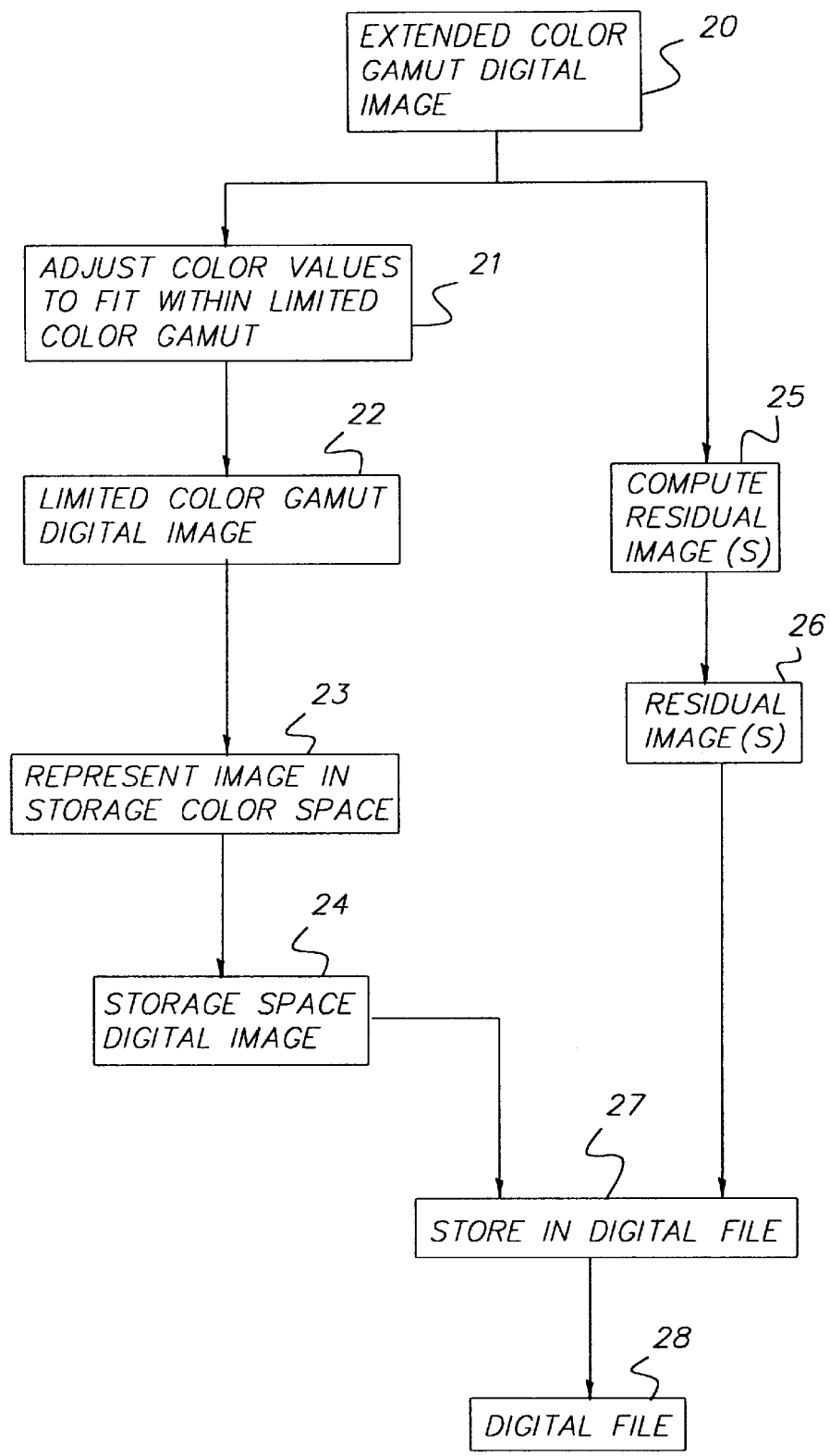
FIG. 2 is a flowchart showing a process for making a limited gamut digital image in accordance with the present invention.

One method for storing a digital image in accordance with the present invention is shown in FIG. 2. An extended color gamut digital image 20 has color values that are outside the limited color gamut of a storage color space. An adjust color values step 21 is used to limit the color values to those that will fit within the limited color gamut of the storage color space to form a limited color gamut digital image 22. Next, a represent image in storage color space step 23 is used to produce a storage space digital image 24. A compute residual image(s) step 25 is used to determine one or more residual image(s) 26 representing the difference between the extended color gamut digital image and the limited color gamut digital image. The storage space digital image 24 and the residual image(s) 26 are then stored in a digital file 28 using a digital file storage step 27.

A key aspect of the present invention is the creation and use of the residual image(s) 26 representing the difference between the extended color gamut digital image and the limited color gamut digital image. Other prior art systems include the computation of a residual image, but none involve computing a difference between an extended color gamut digital image and a limited color gamut digital image. Nishihara et al. (U.S. Pat. No. 4,903,317) describe the computation of a residual image determined from the difference between an original image, and an image that has been compressed using a lossy data compression technique and subsequently decompressed. The residual image represents the compression artifacts that are introduced during the compression/decompression process. Golin (U.S. Pat. No. 5,122,873) also describes a method for encoding images using a residual image. In this case, the residual image relates to the difference between images of different spatial resolution. It is also known that a residual image can be computed between a high-precision digital image, and a low-precision digital image. In each of these cases, the images being differenced have identical color gamuts and color spaces. As a result, none of these prior art configurations would support the storage of extended color gamut information as required in the present invention.

Each of the steps in FIG. 2 will now be discussed in more detail. The extended color gamut digital image 20 can take many different forms. For example, the image can be a scanned photographic print, a scanned photographic negative, a scanned photographic transparency, or an image from a digital camera, etc. Depending on the source of the image, as well as any image processing that has been applied to the image, the image can have very different color gamuts and color representations. Images from scanned photographic negatives and digital cameras can contain scene information having a much larger luminance dynamic range than can be encoded in many storage color spaces. In this case, luminance dynamic range is simply one aspect of color gamut related to the range of luminance values that can be represented.

The color gamut of an imaging system is the range of colors that can be represented or produced. Since color is fundamentally a three-dimensional phenomenon, color gamuts can be viewed as a three-dimensional volume. Color values that are within the volume are said to be "in-gamut," whereas colors that are outside the volume are said to be "out-of-gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta and yellow).

If the image were a scanned photographic print, the color gamut of the image would generally be the color gamut of the original photographic print medium. Likewise if the image were captured by a digital camera, the color gamut of the image would generally be that of an original scene, although it can be limited by the dynamic range of the camera sensor and by lens flare. The color space that the image is represented in is somewhat independent of the color gamut of the original image. For example, the color values for a scanned photograph can be represented as raw scanner code values, or they can be given by device independent color values according to a color space such as the CIELAB color space. Alternatively, the color values can be expressed in some other color space.

Figure 1:
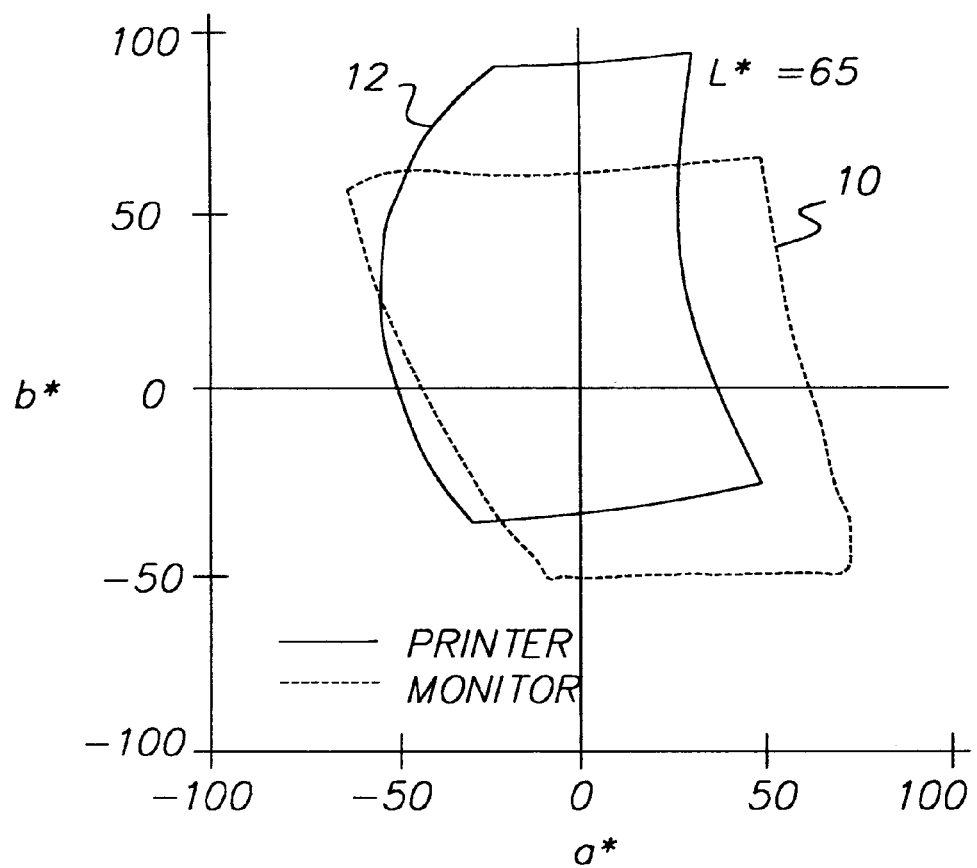
FIG. 1 is graph comparing the color gamuts of a typical video display, and a typical reflection print.

For many applications, it is convenient to store, display and manipulate the digital image in a particular storage color space that is well-suited for the work flow associated with that application. Frequently, the storage color space that is chosen will be a device dependent color space associated with a common output device or medium used by the system. In many cases, video RGB color spaces are used because they can be displayed or previewed directly on a computer video display without any further processing. Additionally, many software applications that are available to manipulate images on a computer are designed to work with images in a video RGB color space. The color gamut of the storage color space will often be smaller than, or at least different than, the color gamut of the extended color gamut digital image 20. As a result, there generally will be colors in the extended color gamut digital image 20 that can not be represented in the storage color space. For example, consider the case where the extended color gamut digital image 20 is a scanned photographic print. There are many colors within the color gamut of the reflection print that are outside the color gamut of the video RGB color space. This can clearly be seen in FIG. 1 which shows cross-sections through a typical Video RGB Color Gamut 10, and a typical Reflection Print Color Gamut 12.

Therefore, information must be discarded in order to store the reflection print color values in a video RGB color space, or any other limited color gamut storage space. In prior art methods, the information that is discarded is lost permanently and can not be recovered. In the present invention, the information that is lost will be stored in one or more residual image(s).

The adjust color values step 21 is used to adjust the color values of the extended color gamut digital image to fit within the limited color gamut of the storage space, forming a limited color gamut digital image 22. In this step, information must be discarded when color values that are outside the limited color gamut are mapped to color values within the limited color gamut. In some cases, the color values for the out-of-gamut colors are simply "clipped," i.e., they are mapped to color values the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut can also have a larger luminance dynamic range than can be represented in the limited color gamut. In the case where it is necessary to reduce the luminance dynamic range of the image, one part in the implementation of the adjust color values step 21 is typically the application of a tone scale function. The tone scale function maps the input image intensities to output image intensities and might be applied to a luminance channel of the image, or alternatively to each color channel of an RGB color representation. In some applications, the image being processed can actually be a monochrome image, e.g., a black-and-white image. In this case, the tonescale function can be applied to the monochrome image luminance values.

For cases where the extended color gamut digital image is a representation of the colors in an original scene, the adjust color values step 21 will typically involve determining reproduced color values that will produce desired aim colors on a target output device. For example, optimal color reproduction aims can be applied to determine desired video RGB aim colors for the original scene colors. The process of transforming the original scene color values into aim reproduced color values is sometimes referred to as "rendering" the image.

Once the limited color gamut digital image 22 has been determined, the next step is to represent it in the storage color space using the represent image in storage color space step 23. The output of this step is a storage space digital image 24. This step typically involves applying a device model, or a color space conversion, to determine the storage space color values that correspond to the adjusted color values of the limited color gamut digital image 22. For example, if the adjusted color values were specified in terms of the CIELAB color space, a video display device model can be used to determine the corresponding video RGB values that would be necessary to produce the specified adjusted color values.

A compute residual image(s) step 25 is used to determine one or more residual image(s) 26 representing the difference between the extended color gamut digital image 20 and the limited color gamut digital image 22. In its simplest form, a single residual image 26 can be calculated by simply subtracting the adjusted color values of the limited color gamut digital image 22 from the input color values of the extended color gamut digital image 20. The residual image would then be in terms of the color space used to represent those color values. Alternatively, the color values can be transformed into some other space that would be useful for computing the residual image. For example, it might be desirable to compute the residual image in a color space that is well-suited for compressing the residual image or that is convenient for use in reconstructing the extended color gamut digital image.

There are several reasons why it may be advantageous to store multiple residual images instead of just a single residual image. For example, it might be desirable to store residual errors associated with luminance errors in one residual image, and residual errors associated with chrominance errors in additional residual images. This would enable an application to make a choice about which types of residual errors it would use during the process of determining a reconstructed extended color gamut digital image.

In another case, a set of multiple residual images can correspond to different subsets of extended dynamic range image data. For example, a first residual image can extend the dynamic range of the digital image some fixed amount beyond the dynamic range associated with the limited color gamut digital image. A second residual image can then extend the dynamic range an additional increment beyond the extended dynamic range associated with the first residual image. In this way, an application using the extended color gamut digital image can use only the residual image(s) associated with the amount of extended dynamic range required by the application.

Another reason that using multiple residual images is useful is for cases where the residual images are stored in tags in the digital file having a limited size. In this case, the residual image data can be broken into smaller pieces that would fit within the size limitations. For example, residual images can be determined for subsets of pixels in the extended color gamut digital image. In this way, the residual image data can be stored in a tiled fashion.

Generally, the extended color gamut digital image and the limited color gamut digital image 22 should be represented in the same color space before the residual image(s) are calculated so that the in-gamut colors will be given by zero residual errors. Since most images will only have a small fraction of color values that are out of gamut, the residual image(s) will be dominated by zeros, and therefore will be highly compressible.

For cases where the adjust color values step 21 involves the application of a transform that modifies the color values for the colors within the limited color gamut as well as those outside the limited color gamut, the residual image is determined by directly computing the difference between the input color values of the extended color gamut digital image and the adjusted color values of the limited color gamut digital image 22 would have a large number of non-zero values. This can be undesirable for cases where the residual image is to be compressed. The prior example where the extended color gamut digital image is a representation of the original scene, and the adjust color values step 21 includes rendering the color values to determine desirable color values for a target output device, will generally suffer from this problem. In this case, it may be desirable to apply a second rendering function to the extended color gamut digital image to determine a second set of rendered color values that are desirable for another output device having a larger color gamut than the first target output device. If the second rendering function were identical to the first rendering function throughout most of the color gamut, then a residual image computed by taking the difference between the first and second rendered images would again be largely dominated by zero differences. In one preferred embodiment of the present invention, the first rendering function can produce a rendered image that is optimized for a video display, and the second rendering function can produce a rendered image that is optimized for some hypothetical output device having an idealized large color gamut.

Once the residual image(s) 26 have been calculated, they should be associated in some fashion with the storage space digital image 24. This can involve storing the residual image(s) 26 in a memory buffer that is associated with a second memory buffer used to store the storage space digital image 24. Alternatively, many applications will store the image data in a digital file 28 on some sort of digital storage media such as a magnetic disk, an optical disk, or a PCMCIA card using a digital file storage step 27. In this case, the storage space digital image 24 and the residual image(s) 26 can be stored in two different files, or can be stored in the same digital image file. In many cases, the file format used to store the storage space digital image 24 may support the use of private image tags. For example, the file formats TIFF, EXIF and FlashPIX all support tags of this sort. These tags are sometimes referred to as meta-data. In cases where file formats of this type are used, it will be convenient to store the residual image data in the form of a residual image tag. In this way, applications that do not know how to make use of the residual image tag will simply ignore it, and will therefore have access only to the storage space digital image 24. Whereas applications that know how to use the residual image tag will be able to make use of it to reconstruct the extended color gamut digital image. Some file formats place a limit on the size of tags, so compression of the residual image is important for these applications.

For the remainder of this disclosure, the case of a single residual image will be described. However, it should be recognized that the method can be easily generalized to use a set of multiple residual images.

Figure 3:
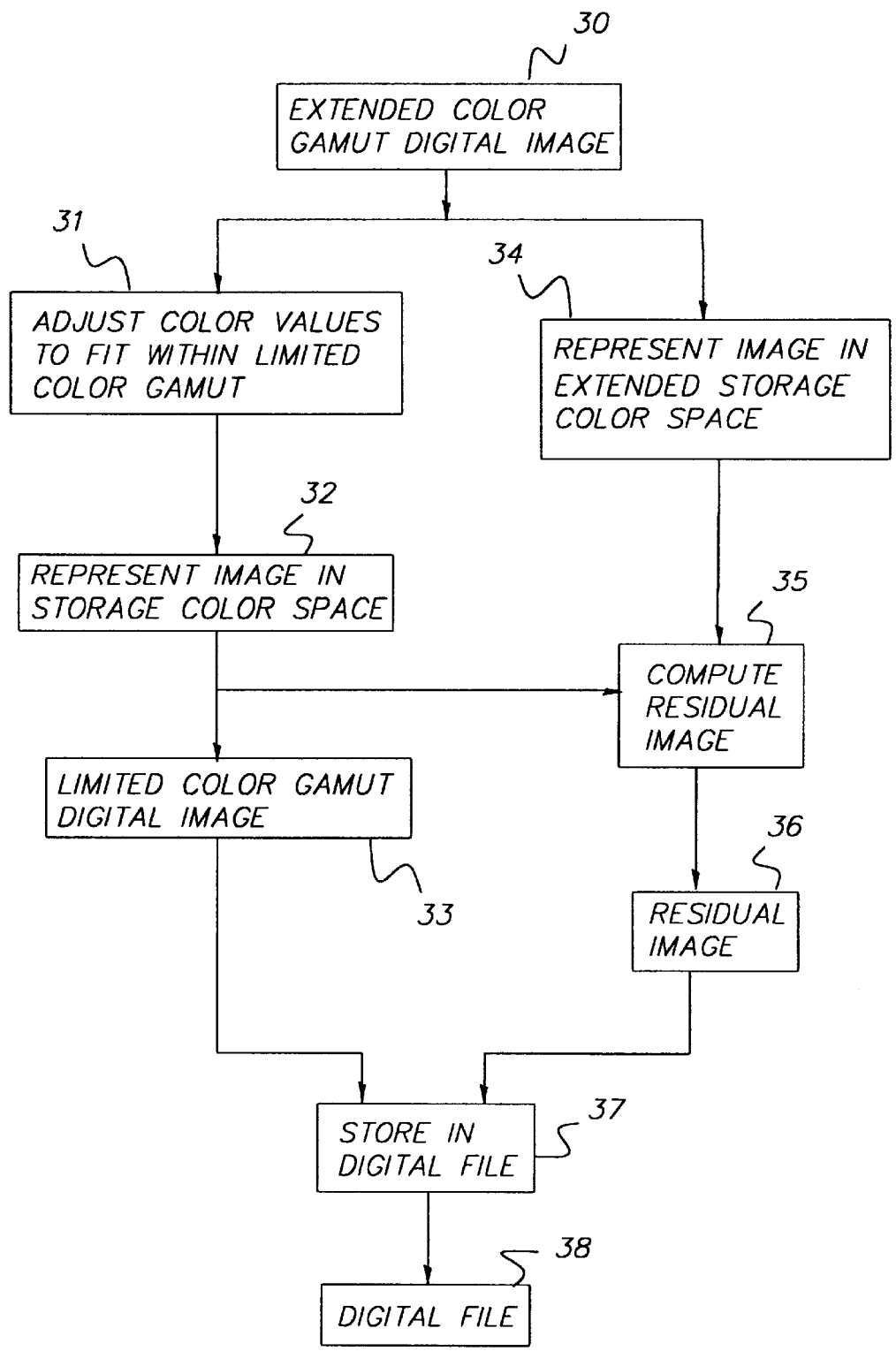
FIG. 3 is a flowchart showing a second process for making a limited gamut digital image in accordance with the present invention.

A second method of storing a digital image in accordance with the present invention is shown in FIG. 3. This embodiment is similar to that shown in FIG. 2 but differs in the way that the residual image is determined. In this second embodiment, the residual image is represented relative to the code values of the storage color space. FIG. 3 shows an extended color gamut digital image 30, having color values that are outside the limited color gamut of a storage color space. An adjust color values step 31 is used to limit the color values to those that will fit within the limited color gamut of the storage color space. Next, a represent image in storage color space step 32 is used to produce a limited color gamut digital image 33. A represent image in extended storage color space step 34 is then applied to the original image, and a compute residual image step 35 is used to determine a residual image 36 representing the difference between the extended color gamut digital image and the limited color gamut digital image, both being encoded according to the storage color space. The limited color gamut digital image 33 and the residual image 36 are then stored in a digital file 38 using a digital file storage step 37.

Since most of the steps in this second method are identical to the corresponding steps in the first method, only the steps that differ will be discussed in more detail. The primary difference between the two methods is that the residual image is computed relative to the storage color space color values in this case. Therefore, the original extended color gamut digital image must be transformed to the storage color space in addition to the limited color gamut digital image. This is accomplished by the represent image in extended storage color space step 34. The complication is that the storage color space will typically only have a limited color gamut. For example, if the storage color space is a video RGB color space, then the color gamut of the storage space can be limited to the color gamut of the video display. Therefore, to represent the original extended color gamut digital image in the storage color space, it is necessary to define an extended version of the storage color space that does not impose the limited color gamut. For example, 24-bit video RGB color spaces usually encode the color values in terms of integer code values in the range of 0 to 255. In order to allow the encoding of colors outside the color gamut of the video display, the original extended color gamut digital image can be represented in an extended storage space where the code values were allowed to go outside the range 0 to 255. This would permit the encoding of colors with higher chroma values, as well as larger luminance dynamic range values, than can be encoded directly in the storage color space. After both the limited color gamut digital image and the extended color gamut digital image had been represented in terms of the storage color space, the residual image 36 is then calculated as before by computing a difference between the two images.

The result of applying the method of the present invention is the creation of both a limited color gamut digital image in a storage color space and an associated residual image which correlates the limited color gamut digital image to an extended color gamut digital image. As discussed previously, the limited color gamut digital image is generally well suited for display on a target output device such as a video display. One advantage of this approach is that systems that cannot make use of the residual image will be able to display and manipulate this image directly with no image quality or computation disadvantage relative to the prior art where only the limited color gamut digital image is stored. However, the information that normally would have been discarded has now been stored in the residual image and is available for use by systems that can utilize it. In this case, the limited color gamut digital image is extracted and the residual image from the digital file is used to form a reconstructed extended color gamut digital image.

Figure 4:
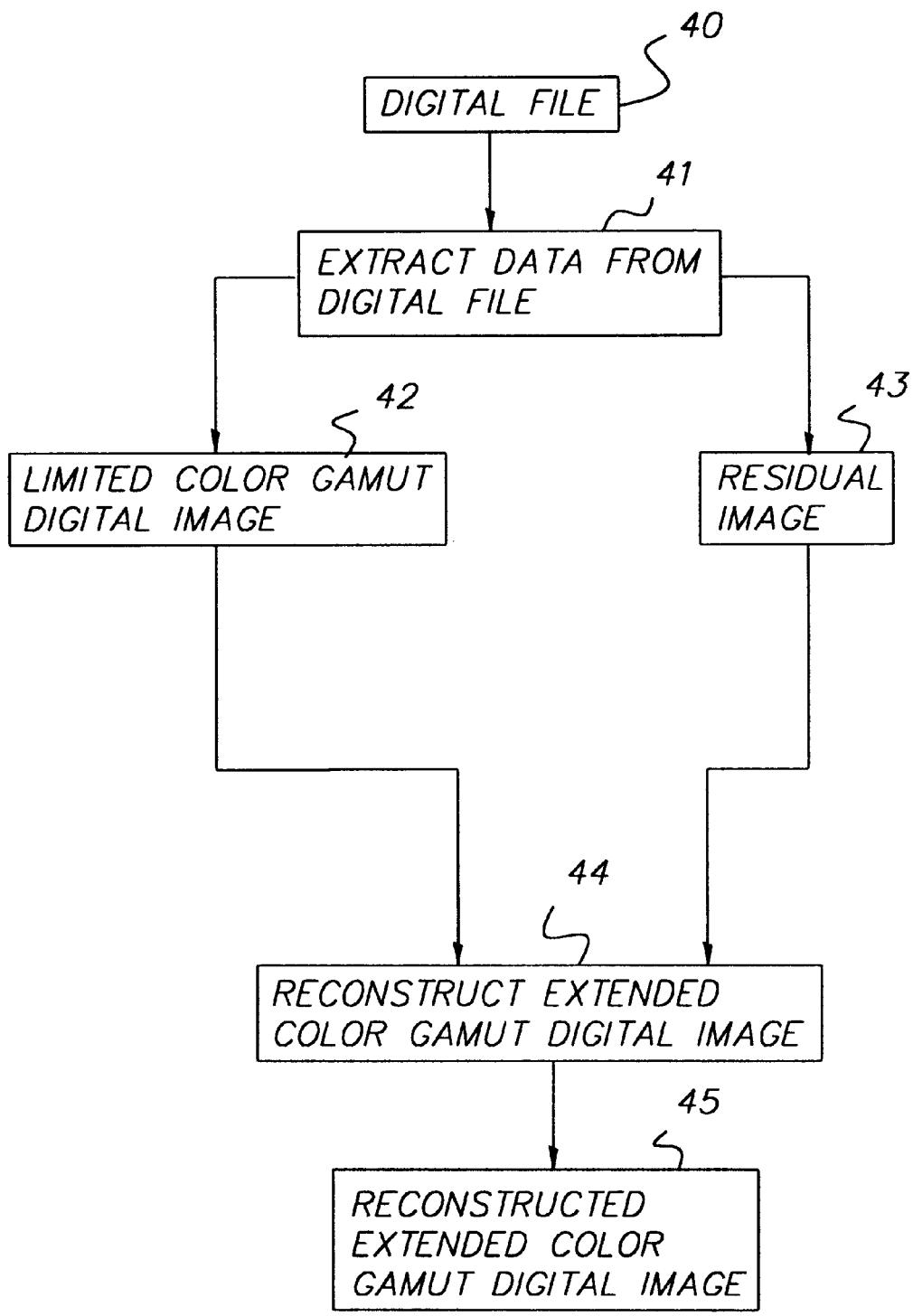
FIG. 4 is a flowchart showing the reconstruction of a extended gamut digital image from the limited digital image of FIG. 2.

FIG. 4 shows an example of reconstructing an extended color gamut digital image from the limited color gamut digital image and the residual image. The input to this process is an extended color gamut digital file 40 containing a limited color gamut digital image and a residual image created as described above. An extract data from digital file step 41 is used to extract the limited color gamut digital image 42 and the residual image 43. A reconstruct extended color gamut digital image step 44 is then used to form a reconstructed extended color gamut digital image 45 by combining the limited color gamut digital image 42 and the residual image 43. Typically the reconstruct extended color gamut digital image step 44 will involve combining the limited color gamut digital image 42 and the residual image 43.

The reconstructed extended color gamut digital image can be used for many different purposes. For example, it can be used to form a digital image appropriate for display on an output device having a color gamut different from the limited color gamut of the limited color gamut digital image 42 in the digital file 40. This enables the generation of an optimal print from the original extended color gamut digital image, rather than a print limited by constraints of the storage color space.

Figure 5:
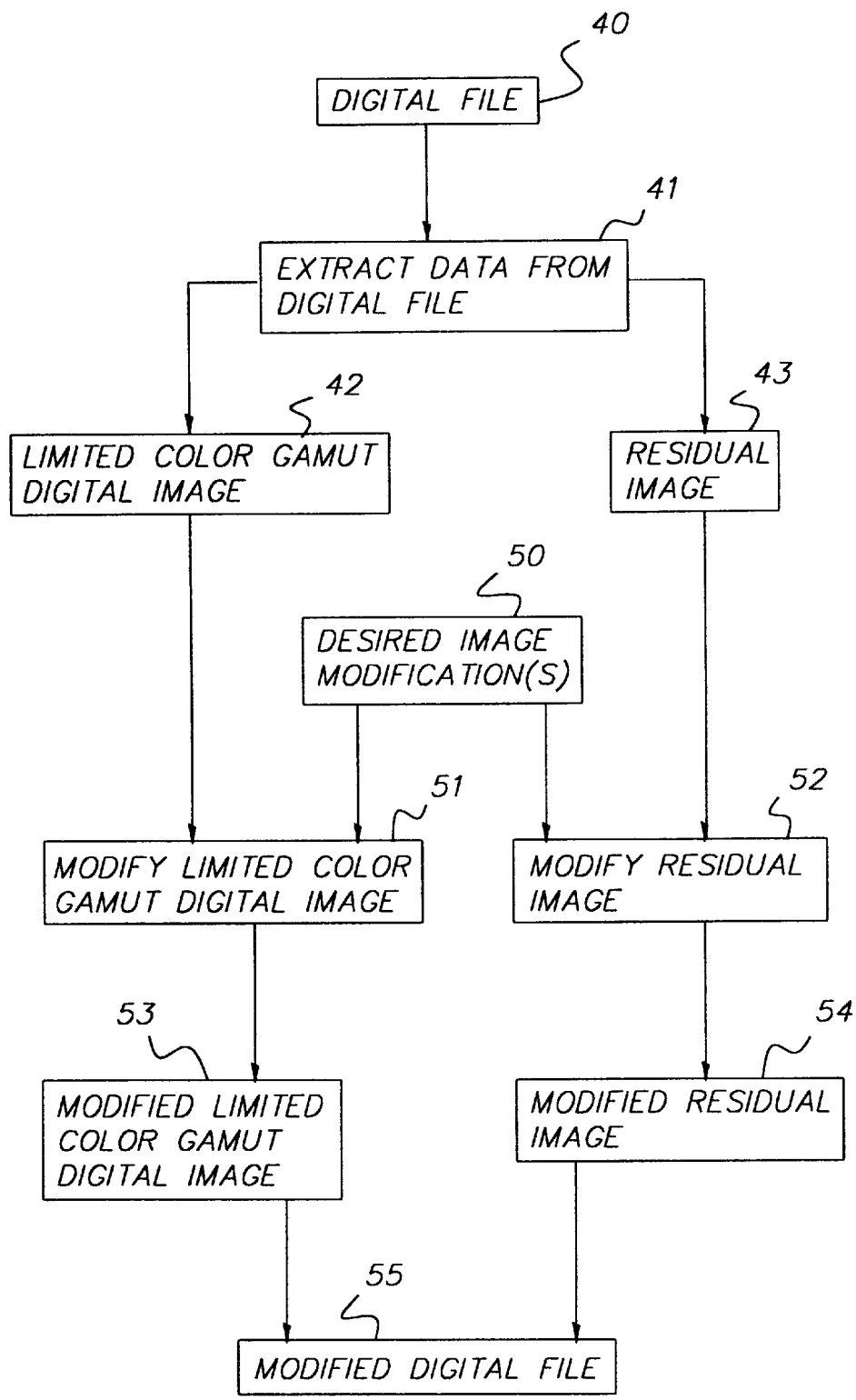
FIG. 5 is a flowchart showing the modification of the limited color gamut digital image and the residual image(s) in accordance with the present invention.

The information in the extended color gamut is particularly useful during the process of applying a modification to the digital image. Consider FIG. 5 which shows one method for modifying an extended color gamut digital image in accordance with the present invention. The input to this process is an extended color gamut digital file 40 containing a limited color gamut digital image and a residual image created as described above. As in FIG. 4, an extract data from digital file step 41 is used to extract the limited color gamut digital image 42 and the residual image 43. One or more desired image modification(s) 50 are then specified to be used to modify the image. The limited color gamut digital image 42 is then modified using a modify limited color gamut digital image step 51 in response to the desired image modification(s) 50 to form a modified limited color gamut digital image 53. Likewise, the residual image 43 is modified using a modify residual image step 52 in response to the desired image modification(s) 50 to form a modified residual image 54. The modified limited color gamut digital image 53 and the modified residual image 54 taken together represent a modified extended color gamut digital image which can be stored in a modified digital file 55. Alternatively, the modified digital image can be used to produce an image on a digital printer, or some other form of image display device. The modified digital image can also be transmitted to a remote location for storage or printing at that location. Methods for transmitting the modified digital image can include the use of a computer network connection, or a modem connected to a telephone line.

There are many different types of desired image modification(s) 50 that can be applied to the digital image. For example, there are many kinds of color and tone reproduction modifications that can be applied to an image. In some cases it will be desirable to adjust the color balance of the image. In other cases it will be desirable to adjust the density of the image so as to produce a darker image or a lighter image. Other types of color and tone reproduction modifications can include changes in the contrast, hue or colorfulness of the image. In some cases, it will also be desirable to modify the color and tone reproduction characteristics to optimize them for a specific output device. The present invention is particularly well-suited to making modifications to the color and tone reproduction characteristics of the image due to the fact that the extended color gamut information stored in the residual image will enable larger changes to be made without any degradation in quality. For example, consider the case where an original image is determined to be over-exposed. In this case, highlight information in the limited color gamut digital image would have been clipped off during the process of rendering the image to the limited color gamut. However, this highlight information would be retained in the residual image. If it were desired to darken the image to correct for the over-exposure error, the information in the residual can then be used to determine a modified digital image that recovers the highlight detail.

Other types of image modifications that can be applied to a digital image include spatial image modifications. Examples of spatial image modifications include zooming, cropping, noise reduction, and sharpening the image. Zooming an image involves a resizing of the image. Cropping an image involves selecting a subset of an image. A noise reduction process generally involves reducing the appearance of image grain or noise by smoothing the image in flat areas of the image. Sharpening an image typically involves applying a spatial convolution to the image to increase the apparent sharpness of edges in the image. There are many other types of image modifications such as those found in common image editing software programs such as the widely used Adobe PhotoShop.

In some cases a single image modification could be desired, whereas in other cases, it may be desirable to apply several modifications to the image. For example, it might be desirable to darken the image, crop out a subset of the image, and then sharpen the image. Depending on the type of modifications that are desired, it is possible to apply the modification(s) simultaneously, or it may be necessary to apply them sequentially.

Modifications to the digital image can be interactively user specified, such as in the case of a user adjustable lightness knob. In this case, a preview of the image is generally displayed on a video display, and a user interface is provided to permit the user to specify his/her desired modification(s). Image modifications can also be determined by applying an automatic algorithm to the digital image. For example, a "scene balance algorithm" can be used to estimate the best color balance and density level for an image. Alternatively, an automatic sharpening algorithm can be used to estimate the optimal amount of sharpening for an image.

In some cases, only the limited color gamut digital image may be available during the step of specifying the desirable image modification(s). For example, consider the case where the limited color gamut digital image is in a video RGB color space that is appropriate for display on a computer's video monitor. Certain software applications are designed to manipulate this video RGB image using an interactive user interface. The user interface can enable the user to control a color balance slidebar to determine the preferred color balance position. In this case, once the preferred color balance position were determined, this information can then be used to modify the extended color gamut digital image as described above. Similarly, the user can interactively determine desired zooming and cropping parameters based on the limited color gamut digital image and these changes can then be applied to the extended color gamut digital image. In some cases, even automatic algorithms that can be used to estimate the optimal image modification(s) can be designed to operate on a limited color gamut digital image. For example, a scene balance algorithm can be applied to a limited color gamut digital image, and the resulting image modification(s) can then be applied to the extended color gamut digital image. Even if the limited color gamut digital image is not stored in the color space used to preview the image, it may be necessary or convenient to provide a user interface where the desired image modification(s) can be determined by manipulating a preview image which is determined from the limited color gamut digital image.

Figure 6:
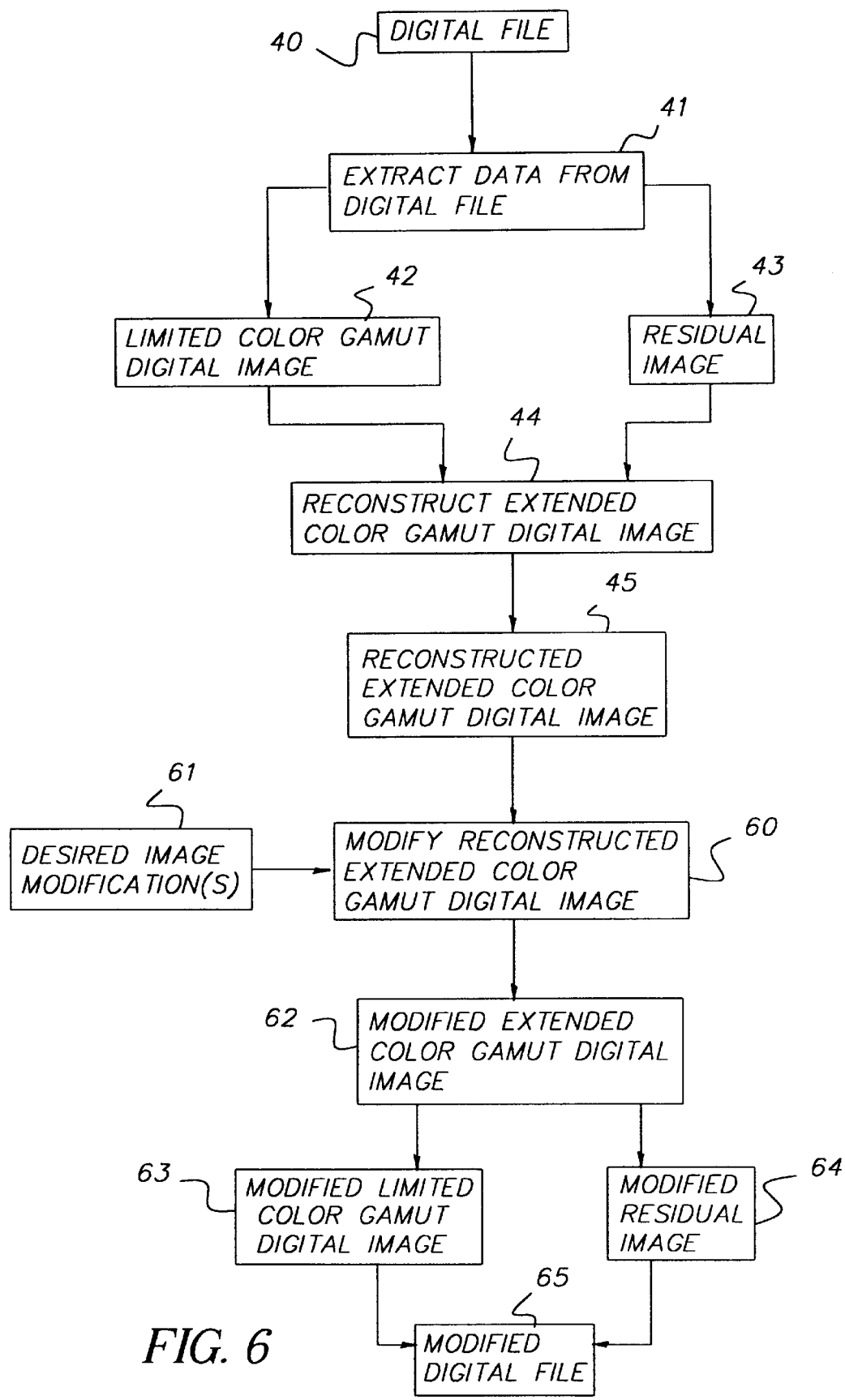
FIG. 6 is a flowchart showing the modification of the extended color gamut digital image in accordance with the present invention.

Another embodiment of the present invention is shown in FIG. 6. In this case, a limited color gamut digital image 42 and a residual image 43 are used to form a reconstructed extended gamut digital image 45 as was described above with reference to FIG. 4. Desired image modification(s) 61 are then used to form a modified extended color gamut digital image 62 using a modify reconstructed extended color gamut digital image step 60. The modified extended color gamut digital image 62 can then be used to determine a modified limited color gamut digital image 63 and a modified residual image 64 using the same methods that were described above. The modified limited color gamut digital image 63 and the modified residual image 64 can then be optionally stored in a modified digital file 65. This method differs from that shown in FIG. 5 in that the desired image modification(s) are applied to the reconstructed extended gamut digital image 60 rather than independently to the uncombined limited color gamut digital image 42 and residual image 43. In cases where complex image modification such as sharpening or color/tone adjustments are desired, it will be more convenient in many cases to use this approach. In other cases, such as for zoom and crop operations, it would not be necessary to go through the extra steps involved with forming the reconstructed image.

Figure 7:
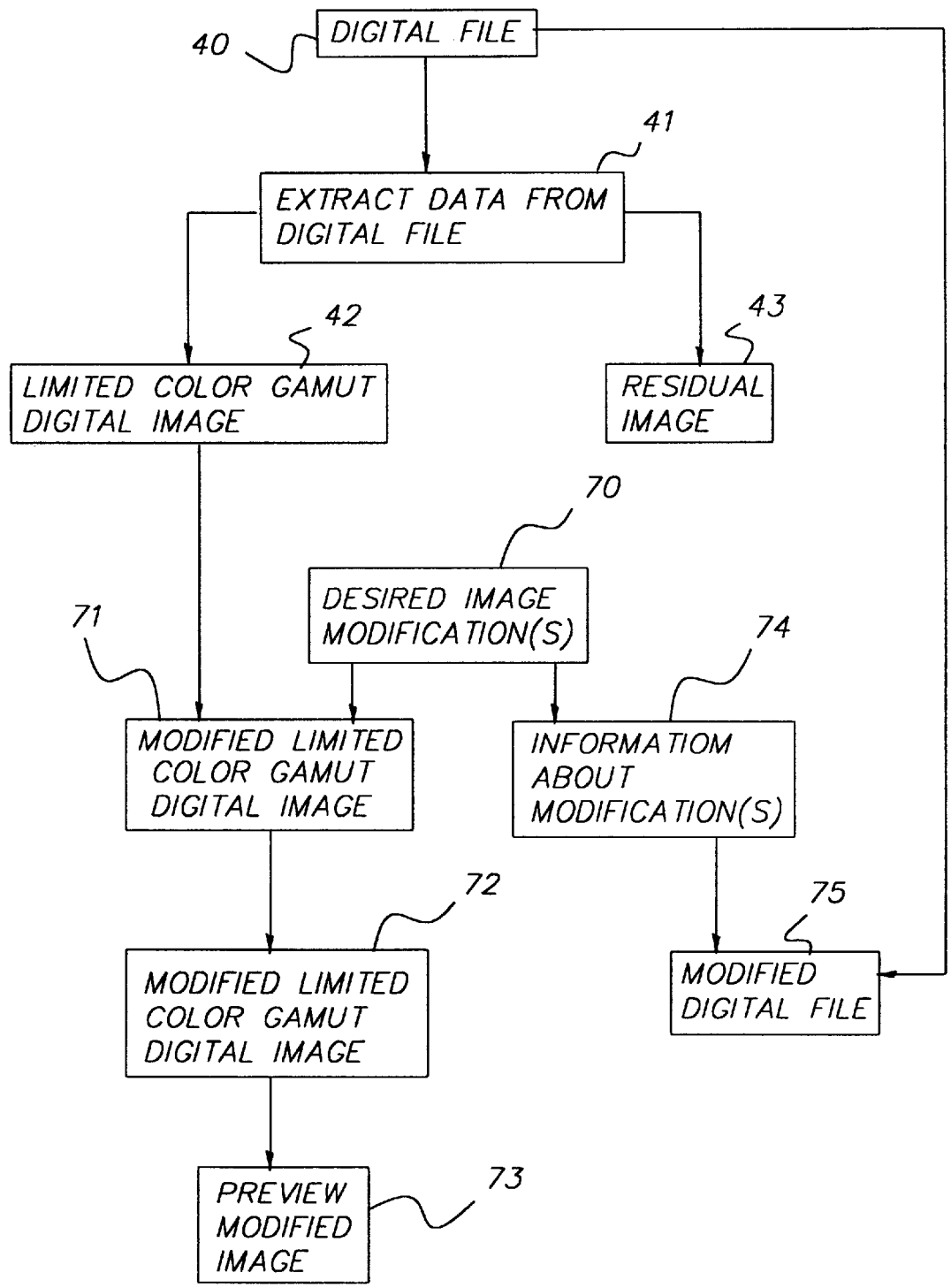
FIG. 7 is a flowchart showing the storing of information about desirable image modification(s) in accordance with the present invention.

Yet another embodiment of the present invention is shown in FIG. 7. A limited color gamut digital image 42 and a residual image 43 are extracted from a digital file 40 using an extract data from digital file step 41 as was describe in reference to FIG. 4. In this case, one or more desired image modification(s) 70 are applied to the limited color gamut digital image 42 using a modify limited color gamut digital image step 71 to form a modified limited color gamut digital image 72. An optional preview modified image step 73 will be useful in many cases so that a user can decide whether the optimal modification(s) were applied to the image. Once the optimal desired image modification(s) 70 have been determined, information about the modification(s) 74 is then added to the input digital file 40 to form a modified digital file 75. For example, the information about the modification(s) 74 might include a list of the operations that were applied to the image, or a set of parameters describing the net effect of the modification(s). One case where this approach will be useful is when it is desired to preserve the original image in an unmodified form as long as possible. In another case of interest the digital file may exist at a remote site, and only a low-resolution version of the limited color gamut digital image can be downloaded to a local workstation that is used to determine the image modification(s). It would only be necessary to send the information about the modification(s) 74 back to the remote site, rather than a modified high resolution image. In this case, it may be desirable to transmit a low-resolution version of the residual image to the local site as well for use in previewing the image modification(s).

Figure 8:
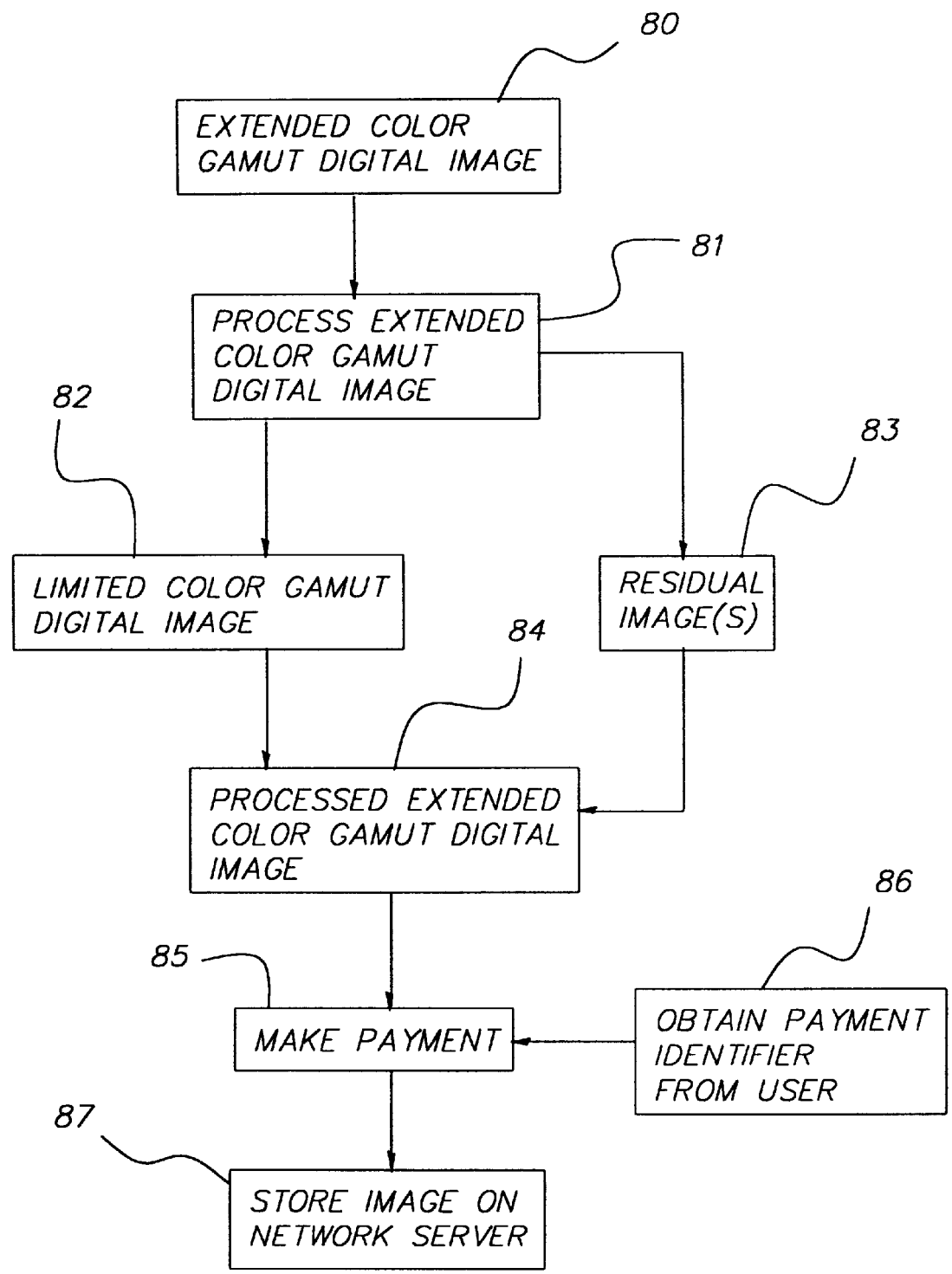
FIG. 8 is a flowchart showing the processing of the extended color gamut digital image in accordance with the present invention.

FIG. 8 shows a flowchart for a preferred embodiment of the present invention where processed extended color gamut digital images are stored on a network server such that they can be made available via a digital communications network. First, one or more extended color gamut digital images 80 are sent to a processing site by a user. In one embodiment of the present invention this is accomplished by the user supplying photographic negatives to the processing site, either my mail, or by delivering the negatives to a processing site. The negatives can be in a developed or undeveloped form. The negatives would then be developed if necessary, and then scanned to produce extended color gamut digital images 80. Alternatively, the extended color gamut digital images 80 could be supplied directly by the user, either over a communications network, or on a computer readable storage medium such as a magnetic disk, a CDROM, or a PCMCIA card. The extended color gamut digital images 80 could originate from a digital camera, or alternatively could originate from scans of conventional photographic materials such as prints, slides or negatives. The extended color gamut digital images 80 could also originate from computer generated imagery.

Next, each extended color gamut digital image 80 is processed using a process extended color gamut digital image step 81 to produce a limited color gamut digital image 82 and one or more associated residual image(s) 83 such that the associated residual image(s) 83 and the limited color gamut digital image 82 are adapted to be used to form a reconstructed extended color gamut digital image. Taken together, the limited color gamut digital image 82 and the residual image(s) 83 comprise a processed extended color gamut digital image 84. As described earlier, the processed extended color gamut digital image 84 can be stored in a single digital image file utilizing meta-data tags, or can be stored in multiple digital image files.

A make payment step 85 is used to obtain payment from the user. This can be done using a cash transaction, or by using an obtain payment identifier from user step 86. For example, the payment identifier can include information about an account from which payment is to be electronically transferred. Alternatively, the payment identifier can include a credit card account where the payment is to be debited. Other forms of payment identifiers are also possible including a check, etc. In one embodiment of the present invention, the payment identifier is obtained from the user via a digital communications network such as the Internet.

Finally, a store image on network server step 87 is used to make the processed extended color gamut digital image 84 available to the user via a digital communications network. Examples of a digital communications network would include the Internet and a local area network. In one embodiment of the present invention, the processed extended color gamut digital image 84 is made available to the user at a specific Internet address. The user may be supplied with a password in order to access the processed extended color gamut digital image 84, or alternatively, the processed extended color gamut digital image 84 might be publicly available. In another embodiment of the present invention, the processed extended color gamut digital image 84 can be transferred to a location designated by the user via the digital communications network. For example, the processed extended color gamut digital image 84 could be sent by E-mail, or could be transferred using a file transfer protocol.

Figure 9:
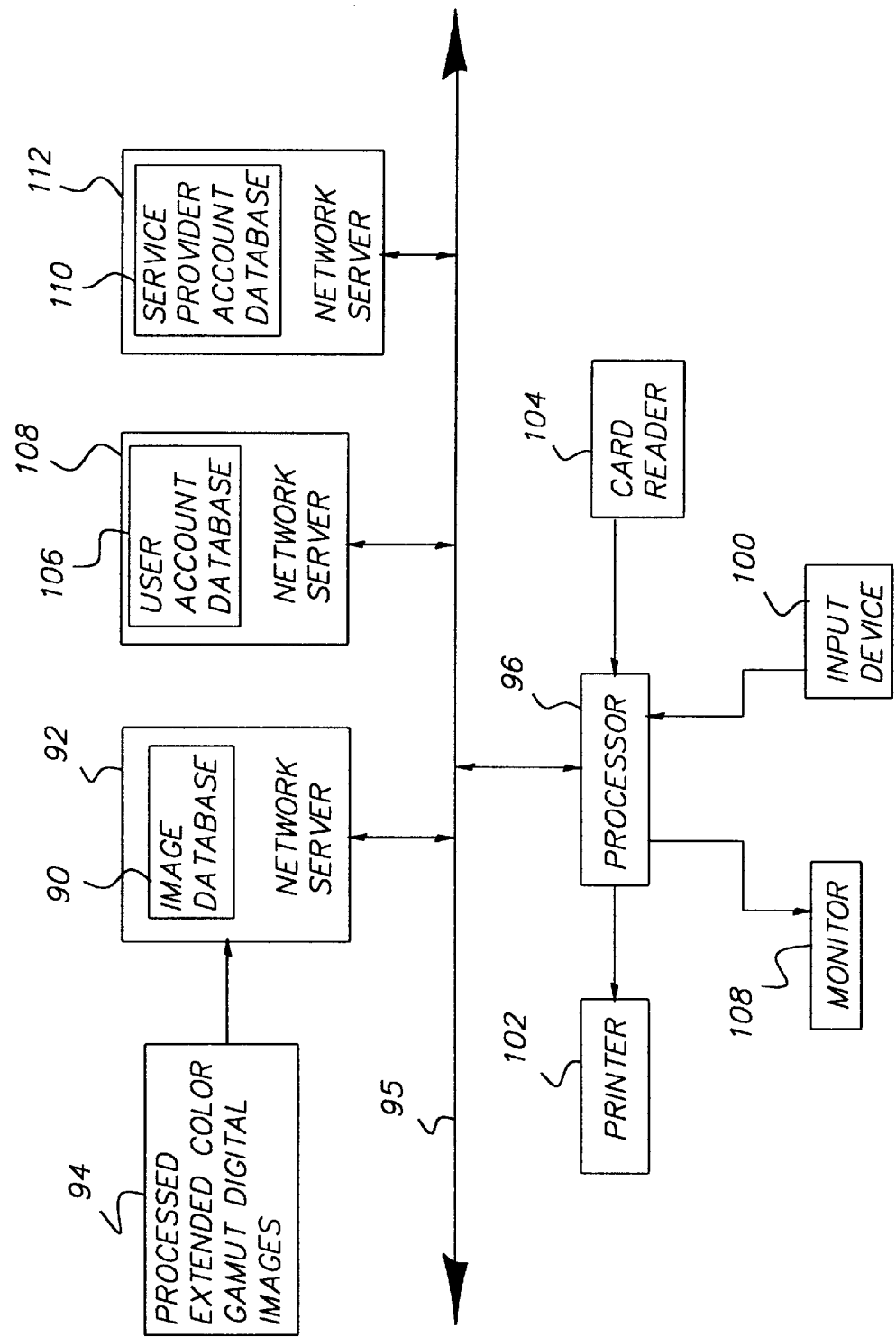
FIG. 9 illustrates a communications network configuration for practicing the current invention.

FIG. 9 illustrates an embodiment of the present invention where the processed extended color gamut digital images are accessed by a digital communications network, such as the Internet. In this case, an image database 90 is located on a network server 92. The image database 90 is used to store processed extended color gamut digital images 94 that have been processed using the methods described earlier to form limited color gamut digital images, and associated residual image(s). The network server 92 is connected to a communications network 95. For example, the communications network 95 could be the Internet, or a local area network. A user uses a processor 96 to access the network server 92 via the communications network 95. The processor 96 can be a home computer, or alternatively it could be a computer in a retail kiosk, etc. Typically, the processor would use a monitor 98 for the purpose of displaying preview images, and providing information to the user. One or more input devices 100 can be used by the user to provide instructions to the processor 96. Examples of typical input devices would include a keyboard, a mouse, a trackball, a touch pad or a touch screen. A printer 102 may also be connected to the processor for providing output prints to the user. Alternatively, a remote printer could also be accessed over the communications network 85. A card reader 104 can also be connected to the processor 96 for purposes of reading account information from a credit card or a debit card as part of the obtain payment identifier from user step 86 that was discussed earlier.

Other network servers can also be attached to the communications network 85. For example, consider the case where a user makes payment via the Internet. One common way for the user to provide a payment identifier to a service provider would be for him or her to supply a valid credit card number. The service provider would then access a user account database 106 on a network server 108 to debit the appropriate payment, which would then be credited to an account specified by the service provider by accessing a service provider account database 110 on another network server 112. After the payment has been transferred, the service provider would then provide the user access to the processed extended color gamut digital image 94 stored in the image database 90. The processed extended color gamut digital image 94 can then be used for purposes such as creating optimal prints on a printer having a different color gamut than the limited color gamut digital image, or for applying desirable image modifications as was described with reference to FIG. 5, FIG. 6 and FIG. 7. An additional payment may be required from the user in order to perform these services.

A computer program product can have one or more computer readable storage media disposed in different processing locations, each having a computer program stored thereon for performing all the steps of the present invention.

Each computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

Parts List

10 video RGB color gamut
12 reflection print color gamut
20 extended color gamut digital image
21 adjust color values step
22 limited color gamut digital image
23 represent image in storage color space step 24 storage space digital image
25 compute residual image(s) step
26 residual image(s)
27 digital file storage step
28 digital file
30 extended color gamut digital image
31 adjust color values step
32 represent image in storage color space step
33 limited color gamut digital image
34 represent image in extended storage color space step
35 compute residual image step
36 residual image
37 digital file storage step
38 digital file
40 digital file
41 extract data from digital file step
42 limited color gamut digital image
43 residual image
44 reconstruct extended color gamut digital image step
45 reconstructed extended color gamut digital image
50 desired image modification(s)
51 modify limited color gamut digital image step
52 modify residual image step Parts List (con't)

53 modified limited color gamut digital image
54 modified residual image
55 modified digital file
60 modify extended color gamut digital image step
61 desired image modification(s)
62 modified extended color gamut digital image
63 modified limited color gamut digital image
64 modified residual image
65 modified digital file
70 desired image modification(s)
71 modify limited color gamut digital image step
72 modified limited color gamut digital image
73 preview modified image step
74 information about modification(s)
75 modified digital file
80 extended color gamut digital image
81 process extended color gamut digital image step
82 limited color gamut digital image
83 residual image(s)
84 processed extended color gamut digital image
85 make payment step
86 obtain payment identifier from user step
87 store image on network server step
90 image database
92 network server
94 processed extended color gamut digital image
95 communications network
96 processor
98 monitor Parts List (con't)

100 input device
102 printer
104 card reader
106 user account database
108 network server
110 service provider account database
112 network server

What is claimed is:

1. A method for processing an extended color gamut digital image so as to represent the extended color gamut digital image in a storage color space having a limited color gamut digital image and for paying for such processed digital image, comprising the steps of:
   a) a user sending or authorizing the sending of an extended color gamut digital image to a processing site where the extended color gamut digital image is to be processed;
   b) processing such extended color gamut digital image at the processing site by:
      i) adjusting the color values of the extended color gamut digital image to fit within the limited color gamut to form a limited color gamut digital image;
      ii) representing the limited color gamut digital image in the storage color space;
      iii) determining one of more residual images representing differences between the extended color gamut digital image and the limited color gamut digital image; and
      iv) associating the one of or more residual image(s) with the limited color gamut digital image in the storage color space such that the associated residual image(s) and the limited color gamut digital image are adapted to be used to form a reconstructed extended color gamut digital image;
   c) the user making payment; and
   d) making the processed extended color gamut digital image available to the user via a communications network.

2. The method of claim 1 where step c) includes obtaining a payment identifier from the user.

3. The method of claim 2 where the payment identifier includes information about an account from which payment is to be electronically transferred.

4. The method of claim 2 where the payment identifier includes a credit card account where the payment is to be debited.

5. The method of claim 4 further including the step of providing a reader for reading a credit card from the user.

6. The method of claim 2 where the payment identifier is obtained from the user via a communications network.

7. The method of claim 1 where step d) includes sending the processed extended color gamut digital image to a location designated by the user via the communications network.

8. The method of claim 1 where step d) includes storing the processed extended color gamut digital image on a network server that the user can access via the communications network.

9. The method of claim 1 further including the step of using one or more of the residual image(s) together with the limited color gamut digital image to form a reconstructed extended color gamut digital image.

10. The method of claim 1 further including the step of applying a desirable image modification to the processed extended color gamut digital image.

11. The method of claim 1 where the storage color space is a video RGB color space.

12. The method of claim 11 further including the step of previewing the digital image by displaying the limited color gamut digital image in the storage color space on a video display.

13. The method of claim 1 where the extended color gamut digital image is a representation of the colors in an original scene.

14. The method of claim 13 where the limited color gamut digital image is determined by rendering the colors of the original scene to produce rendered color values that are desirable for a particular output device.

15. The method of claim 1 where the extended color gamut digital image has a larger luminance dynamic range than the limited color gamut digital image.

16. The method of claim 15 where the step of adjusting the color values of the extended color gamut digital image to determine the limited color gamut digital image includes applying a tone scale function to reduce the luminance dynamic range of the image.

17. The method of claim 10 where the desirable image modification is interactively user specified.

18. The method of claim 10 where the desirable image modification is determined by applying an automatic algorithm to the digital image.

19. The method of claim 10 where the desirable image modification includes applying modified color reproduction aims to the image.

20. The method of claim 10 where additional payment is made in order to apply the desirable image modification.

21. A computer storage product having at least one computer storage medium having instructions stored therein causing one or more computers to perform the method of claim 1.

* * * * *